United States Patent [19]
Christy

[11] Patent Number: 5,607,993
[45] Date of Patent: Mar. 4, 1997

[54] LOW-DENSITY BOUNCING PUTTY

[75] Inventor: Michael Christy, Pleasanton, Calif.

[73] Assignee: North Coast Medical, Inc., San Jose, Calif.

[21] Appl. No.: 202,517

[22] Filed: Feb. 28, 1994

Related U.S. Application Data

[63] Continuation-in-part of Ser. No. 18,142, Feb. 16, 1993, abandoned.

[51] Int. Cl.⁶ .......................... C08K 5/29; C08F 283/12; C08L 85/04
[52] U.S. Cl. .......................... 524/237; 524/265; 524/268; 524/379; 524/588; 524/731; 524/766; 524/857; 525/477; 525/478
[58] Field of Search .................... 525/477, 478; 524/588, 265, 237, 731, 268, 857, 766, 379

[56] References Cited

U.S. PATENT DOCUMENTS

| | | | |
|---|---|---|---|
| 2,431,878 | 12/1947 | McGregor et al. | 260/46.5 |
| 2,541,851 | 2/1951 | Wright | 260/37 |
| 3,661,790 | 5/1972 | Dean et al. | 252/301.3 R |

OTHER PUBLICATIONS

"Handbook of Fillers and Reinforcements for Plastics", Van Nostrand Reinhold Company, 1978, pp. 312–313.
ExpandCel® microspheres, Catalog Nobel Industries, Sundsvall, Sweden.
North Coast Medical Company (San Jose, California), 1992 Hand Therapy Catalog pp. 101–103.

*Primary Examiner*—Karen A. Dean
*Attorney, Agent, or Firm*—Crosby, Heafey, Roach & May

[57] ABSTRACT

The present invention provides a bouncing putty with low density and other desirable properties. The density is preferably between 0.33 and 0.95 g/cc, preferably between about 0.5 and 0.75 g/cc and particularly preferably about 0.6 g/cc. Borosilicone rubber base is mixed with density-reducing filler, preferably in the form of thermoplastic microspheres. Addition of a thinning agent reduces stiffness and addition of a lubricating oil improves the handling characteristics. A moisture scavenger can be added to maintain the characteristics of the bouncing putty even if some moisture is absorbed during use. A polarity modifier such as glycerine can be added to soften the putty. If desired, a colorant can be added as well.

23 Claims, 4 Drawing Sheets

| Additive -> | Density | Working Life | Resistance to Flow | Stickiness |
|---|---|---|---|---|
| Reinforcing Fillers | ↑ | ↑ | ↑ | ↓ |
| Microspheres | ↓ | ↓ | ↑ | ↓ |
| Moisture Scavenger | ↑ | ↑ | ↑ | ↓ |
| Thinning Oil | ↑ | ↓ | ↓ | ↑ |
| Lubricating Oil | ↑ | ↑ | – | ↓ |
| Glycerine | ↑ | ↑ | ↑ | ↓ |

| Additive -> | Density | Working Life | Resistance to Flow | Stickiness |
|---|---|---|---|---|
| Reinforcing Fillers | ↑ | ↑ | ↑ | ↓ |
| Microspheres | ↓ | ↓ | ↑ | ↓ |
| Moisture Scavenger | ↑ | ↑ | ↑ | ↓ |
| Thinning Oil | ↑ | ↓ | ↓ | ↑ |
| Lubricating Oil | ↑ | ↑ | — | ↓ |
| Glycerine | ↑ | ↑ | ↑ | ↓ |

Figure 1

LOW-DENSITY BOUNCING PUTTY

CROSS-REFERENCE TO RELATED CASE

This application is a continuation-in-part of U.S. Ser. No. 08/018,142 filed Feb. 16, 1993 now abandoned.

FIELD OF THE INVENTION

This invention relates in general to low density bouncing putty, generally a borosilicone with light weight additives to provide satisfactory handling properties.

BACKGROUND

Silicone rubbers and elastomers have been known and used since at least the 1940s. See, for example, U.S. Pat. No. 2,431,878, issued Dec. 2, 1947 to McGregor et al. One useful product is a combination of a silicone elastomer with a filling agent to give a bouncing putty. Silicone-containing polymers known as "bouncing putties" are well described in the patent literature, beginning with U.S. Pat. No. 2,541,851, issued Feb. 13, 1951 to Wright.

Bouncing putties are useful in several applications: (1) as novelty item such as Silly Putty®; (2) as a hand strength exercise aid for patients with weak hands, for example for stroke victims or for persons recovering from hand surgery; (3) as a hand strength exercise aid for athletes and executives; and (4) as a "worry bead" type product.

Bouncing putties as an exercise aid are sold in a variety of resistances by North Coast Medical Company (San Jose, Calif.) and by others. Bouncing putties can be prepared in flow resistances from very compliant to very resistant. The more resistant putties can provide a useful exercise aid for athletes, such as golfers, who wish to strengthen their grip, or as a novelty item for people with excess nervous energy who often need to be working something with their hands.

One useful putty base is a dimethylboropolysiloxane compound or borosilicone rubber, often a combination of boric acid with silols and reinforcing silicas. One such bouncing putty base is Q2 3233 from Dow Corning.

Workers in the art recognized as early as the 40s that addition of a silica filler enhanced bouncing properties. Fumed silica or ground silica are still useful fillers. Addition of ground silica gives a product like Silly Putty®. A typical blended putty of this type has an inherent density of about 1.3. Densities of less than about 1.0 g/cc have been difficult to achieve using previous formulations.

Use of alternate fillers, thickening or thinning agents and other materials allow control of a wide variety of properties. For example, a typical modem putty includes oleic acid as a softener and glycerine as a bounce enhancer.

A typical thinning oil is simply silicone oil with a low viscosity, e.g. a viscosity of 10 centistokes (cs). Varying the amount of thinning oil can modify the consistency of a bouncing putty from soft to rock hardness. The intrinsic density of the mixture may vary between about 0.95 (soft) and 1.6 (very hard).

A bouncing putty should provide several desired properties, including good bounce properties and a good "hand," that is, the putty should not be sticky, oily, overly drying, should not leave a residue and should have a long working life.

Others have attempted to achieve light weight by adding lighter fillers but products have suffered from stickiness or oiliness. Previous attempts to incorporate glass or ceramic microspheres have been unsuccessful. The present invention overcomes these problems while providing the advantages of a low density putty.

SUMMARY OF THE INVENTION

The present invention provides a bouncing putty with low density and other desirable properties. The density is preferably between 0.33 and 0.95 g/cc, more preferably between about 0.5 and 0.75 g/cc and particularly preferably about 0.6 g/cc. Borosilicone rubber is mixed with a compatible, density-reducing filler. Addition of a thinning agent reduces stiffness and addition of a lubricating oil improves the handling characteristics. A moisture scavenger can be added to maintain the characteristics of the bouncing putty even if some moisture is absorbed during use. A polarity modifier such as glycerine can be added to soften the putty. If desired, a colorant can be added as well.

Suitable fillers are small particles that contain a gas, preferably air. A class of such fillers are particles, commonly described as microspheres, that encapsulate air in a spherical shell. One preferred form is pre-expanded or expandable thermoplastic microspheres. Useful microspheres may also be formed from phenolic materials, glass, ceramic, silica or other comparable materials. Suitable fillers maintain the density of the final putty within the desired ranges.

One object of the present invention is to provide a bouncing putty with properties not available in existing bouncing putties.

Another object of this invention is to provide a putty which is lighter and has a drier "hand" than existing bouncing putties. The "hand" of a bouncing putty refers to the general feel and handling characteristics of the putty.

A further object of the present invention is to provide a bouncing putty which tends to stay together and tends to not flow rapidly, which reduces the tendency of the putty to stick to the materials such as hair or cloth fibers.

BRIEF DESCRIPTION OF THE DRAWINGS

FIG. 1 illustrates the effect of adding various components of the bouncing putty of this invention.

DETAILED DESCRIPTION OF THE INVENTION

Figure 2:
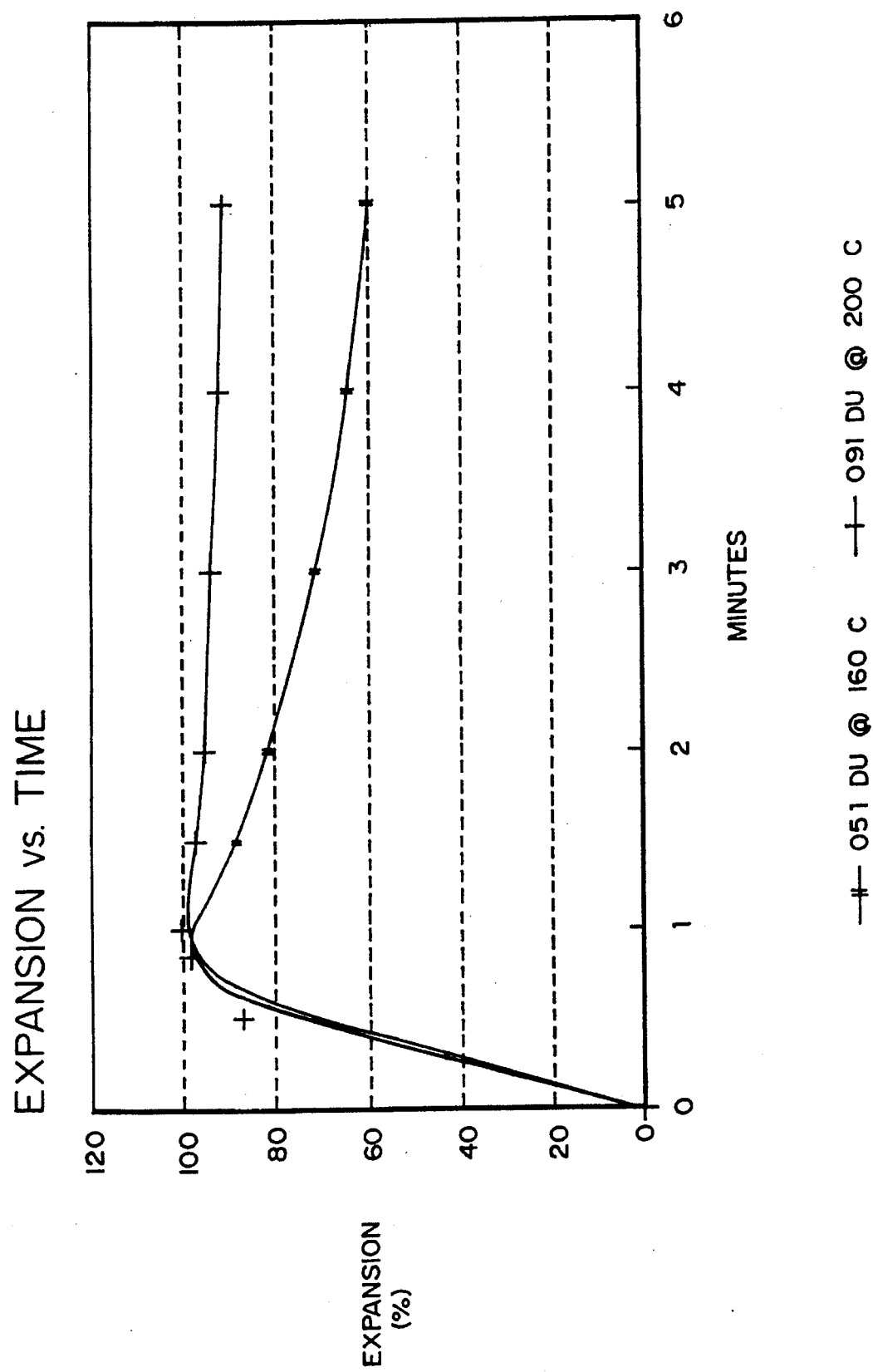
FIG. 2 and 3 illustrate the effect of processing conditions on the resulting density of ExpanCel DU.

The bouncing putty of the present invention provides several advantages: it is lighter and drier than conventional bouncing putties; it has a reduced tendency for sticking to hair or cloth fibers so clothes, bedclothes and carpets stay cleaner; it tends to stay together and behave more like a solid than a liquid; and it maintains its shape and doesn't flow very rapidly. Borosilicone rubber is a very viscous liquid and tends to flow slowly. However, additives in conventional bouncing putties produce a product that can move, like a liquid, into spaces between cloth fibers and stick to or even stain cloth.

One useful bouncing putty is a mixture of borosilicone with silica fillers, as described above. The putty base may be a dimethylboropolysiloxane compound or borosilicone rubber, typically a combination of boric acid with silols and reinforcing silicas. One bouncing putty base is Q2 3233 from Dow Corning. Typical bouncing putty has a density on the order of 1.1 to 1.5 g/cc. The density of bouncing putty can be reduced by removing most of the mineral fillers, which typically have densities of about 2.2 to 4.5, and adding a density-reducing filler such as microspheres.

DENSITY-REDUCING FILLERS

Selecting appropriate density-reducing fillers for the practice of this invention requires consideration of a number of factors. Primarily, they must have a density that allows the production of putties having a final density within the preferred ranges. Such fillers achieve the requisite density because a substantial percentage of their volume consists of entrapped gas. Depending on the specific filler, the volume percentage of gas may be only about 5%, preferably more than about 20%, and up to about 98%. This characteristic allows the fillers to have an effective density much lower than the density of the material from which they are formed. Correspondingly, the gas should remain entrapped by the filler during normal use of the putty. Although a small amount of gas might escape (due to breakage of some microspheres, for example), most will not and the final density of the putty will remain within the preferred ranges.

The density-reducing filler particles can be worked into a base putty to adjust the putty density. One preferred embodiment of the product has a final density between about 0.33 to 0.95, preferably in the range of 0.5 to 0.75 and particularly preferably of about 0.6. The density of suitable fillers can vary between <0.02 to 0.7 g/cc, or more, so the amount of density-reducing filler necessary will vary. One skilled in the art can select a suitable amount of a filler with a selected density to prepare a putty with a selected final density and viscosity. The specific amount of each component can be estimated easily as a volume percentage, based on the density of each component. If too much filler is added, plasticity and handling characteristics of the blended putty may begin to degrade.

Suitable filler amounts can range from about 80% by volume down to the smallest amount necessary to produce a putty with a final density in the preferred range. Depending on the ingredients of a particular putty, the plasticity and cohesion of a putty degrades unacceptably when the filler comprises 70–80% of the putty by volume. Preferably, the amount of filler should comprise 60% by volume or less.

Other characteristics of density-reducing fillers which must be considered are average particle size and friability. At equivalent densities, putties made with larger particles appear more grainy and fall apart more easily when stretched. Thus, the average particle size should be as small as possible. Preferred fillers have an average particle size less than about 200 μm. In many embodiments, average particle size preferably should be less than 100 μm, and more preferably about 50 μm. The particles should also be durable enough to withstand processing and use. The percentage of particles which break during processing or use, and allow the entrapped gas to escape, should not raise the putty density unacceptably, that is, beyond the preferred range. Generally, more friable particles require more careful processing to prevent too high a percentage from breaking.

Thus, a suitable density-reducing filler consists of particles with an average particle size of less than about 200 μm, whose volume consists of a substantial percentage of gas, and that are compatible with a borosilicone rubber base.

Figure 3:
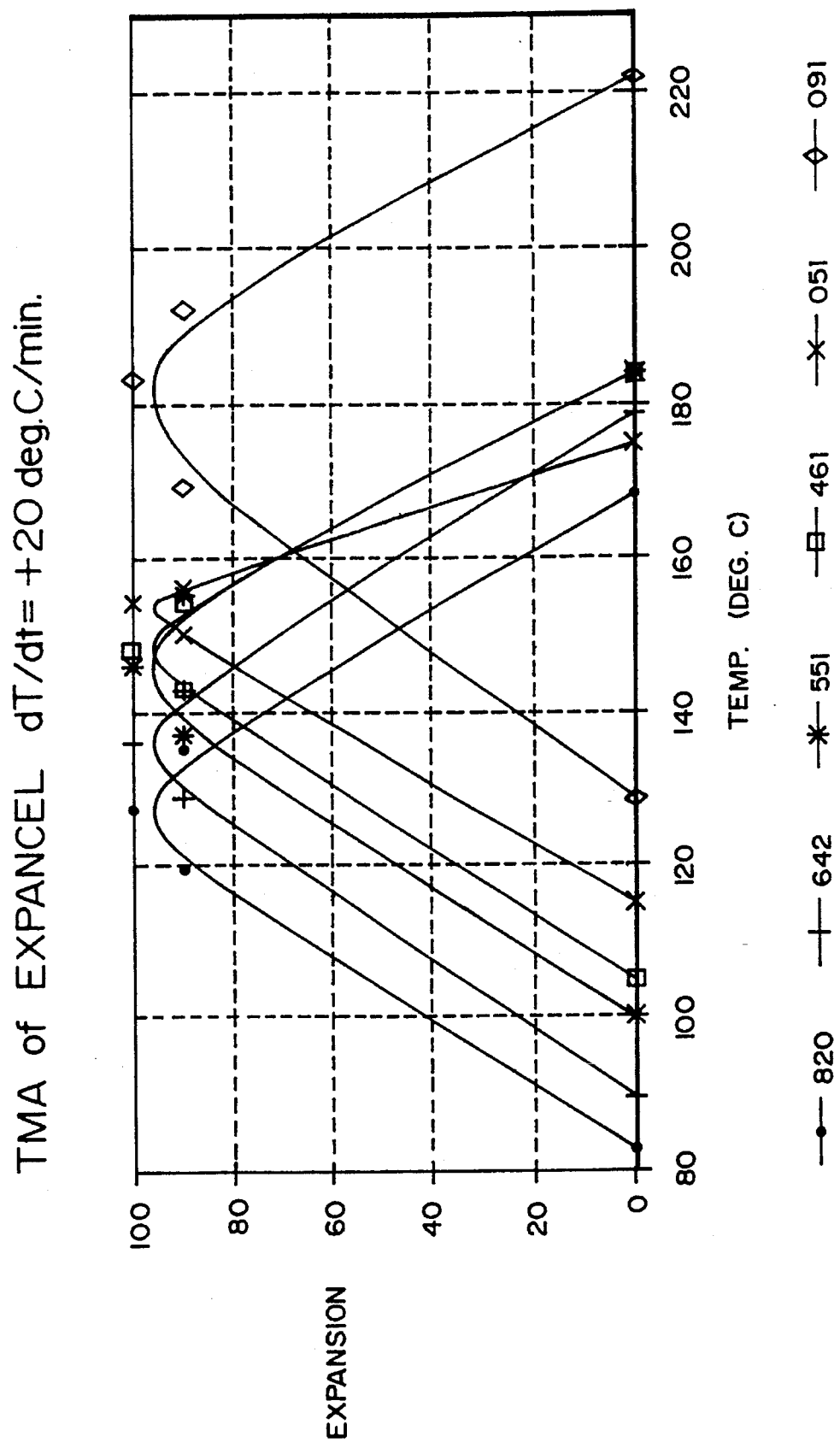
Figure 4:
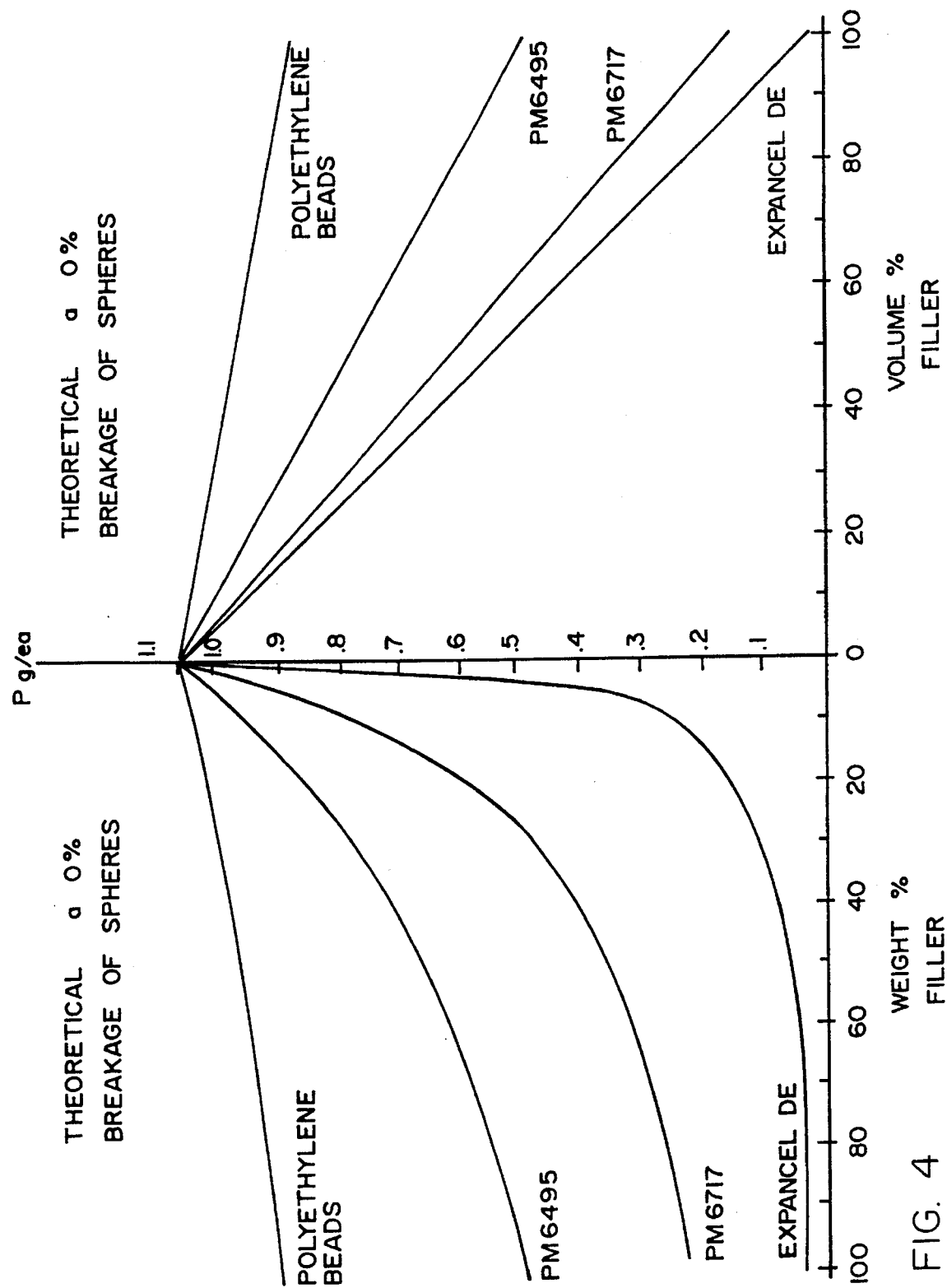
FIG. 4 illustrates the relationship between final putty density and the percentage by volume and weight of various fillers.

In a preferred embodiment, the density-reducing filler is plastic microspheres. Typical plastic microspheres exhibit relatively low density and high resilience. Many are irregular in shape, which promotes bonding and integration of components within the putty. A preferred source of thermoplastic microspheres is ExpanCel® from Nobel Industries, Sundsvall, Sweden. ExpanCel microspheres are available in expanded (DE) and unexpanded (DU) forms. The DE microspheres have typical densities of 0.03 to 0.06 g/cc. The final density of the DU microspheres can be varied by manipulating the processing conditions to cause different degrees of expansion. FIG. 2 illustrates the relation of time to the percent expansion of ExpanCel DU at a given temperature. FIG. 3 illustrates the relation of temperature to the percent expansion of ExpanCel at a given rate of temperature increase. Depending on the selected processing conditions, the density can range from 1.2 g/cc, the density of the unexpanded microspheres, to <0.02 g/cc, the minimum density. The average particle size of the expanded DU and DE microspheres can range from 25 to 75 μm, and typically is 50 μm. Examples 5–7, below, illustrate the use of Expan-Cel 551 DE and 551 DU. ExpanCel 551 DE has a density of 0.036 g/cc and 551 DU can deliver a minimum density of <0.02 g/cc. Both grades have an average particle size of 50 μm. FIG. 4 illustrates the relationship between final putty density and the percentage by volume and weight of 551 DE.

Other density-reducing fillers useful in practicing this invention include glass, ceramic, phenolic or silica microspheres. Generally, these materials are denser than plastic microspheres and also tend to be more friable, making mixing and subsequent manipulation more difficult. Typical glass and phenolic microspheres have densities of 0.2 g/cc while typical silica microspheres have a density of 0.7 g/cc. Ceramic microspheres are typically higher in density than glass microspheres but exhibit greater strength and abrasion resistance.

Glass and ceramic microspheres useful in practicing this invention may be obtained under the name Q-CEL from the PQ Corporation, Valley Forge, Pa. Q-CEL glass and ceramic microspheres have densities ranging from 0.16 to 0.7 g/cc and have particle sizes ranging from 5 to 300 μm. Average particle size depends on the grade, but are available in the range of 40 to 100 μm. Examples 8 and 9, below, illustrate the use of Q-CEL PM* 6495 and Q-CELL PM* 6717. PM* 6495 has an effective density of 0.48 g/cc and an average particle size of 40 μm and Q-CEL PM* 6717 has an effective density of 0.21 g/cc and an average particle size of 55 μm. FIG. 4 illustrates the relationship between final putty density and the percentage by volume and weight of Q-CEL PM* 6495 and Q-CELL PM* 6717.

The prior art includes sporadic references to solid, low-density fillers. One example of a prior art low-density filler is solid polyethylene microbeads. Although such microbeads have been used, the work resulted only in densities only slightly less than 1.0. Dean et al., U.S. Pat. No. 3,661,790, describe a phosphorescent putty with a specific gravity of 0.98 g/cc. However, this density relies on blending 33% by weight with about 50% by volume polyethylene microbeads and an unspecified amount of air into the final putty while processing. Air entrapped in this manner can escape during typical handling or manipulated. Any loss of this air will raise the density of the putty. FIG. 4 illustrates the relationship between final putty density and the percentage by volume and weight of the polyethylene microbeads of the Dean et al. reference. This figure emphasizes the difference between prior art fillers such as polyethylene microbeads and the fillers of this invention.

As density-reducing fillers, microspheres are superior to solid microbeads because microspheres entrap gas within the structure of each particle. While microbeads are limited by the density of the native material, microspheres can be prepared with densities much lower than the native material because a substantial portion of the volume of each microsphere is gas. Further, unless the microspheres are ruptured, the gas remains entrapped and the density of the microspheres, and correspondingly the putty, does not increase with use.

OTHER PERFORMANCE-ENHANCING ADDITIVES

Replacing a traditional filler with a density-reducing filler in a bouncing putty formulation generally reduces the putty's working life, that is, the time for which the putty can be manipulated by a user without losing its basic properties. Various additives can improve the working life of the putty and impart desirable properties. However adding too much of any single component can lead to adverse effects. Not all components discussed below are required in every formulation and one skilled in the art will be able to select which components are necessary for any particular application. The only required components are a putty base and a density-reducing filler. The compromises which should be considered in adding each component are discussed below in context with each component.

It may be useful to add some traditional mineral filler such as silica or barium sulfate. Such fillers can improve the working life, flow resistance, and moisture capacity (decreasing stickiness) but tend to increase the density of the final product.

A mixture of borosilicone base with microspheres as density-reducing filler tends to be stiff as compared to traditional bouncing putty. Viscosity reducing oil, sometimes referred to as a thinning agent, reduces the stiffness, but leads to a sticky product. The actual viscosity of the thinning agent is not critical, although a low viscosity (e.g. 10 cs) silicone oil is preferred. Oils with a viscosity less than about 50 cs, preferably 5–20 cs, are particularly useful. Dow Corning and General Electric sell a variety of suitable silicone oils. A preferred silicone oil is polydimethylsiloxane. Conventional thinning agents such as oleic acid can be used as well but the siloxane based oils are generally preferred.

The amount of viscosity reducing agent to be added can vary widely, particularly since several competing factors must be considered when making a low-density bouncing putty. Enough thinning agent should be added to reduce stiffness but not so much that the product becomes sticky. The amount can easily range from 20–40%, preferably about 30–35% by weight of 10 cs silicone oil. Other materials useful as a viscosity reducing agent include most polydimethylsiloxanes, low molecular weight silanols (hydroxy-terminated polydimethylsiloxanes), dimethyl cyclosiloxanes and polyalkylsiloxanes containing ethyl, isopropyl or phenyl groups.

The plasticity of a mixed putty can easily be tested using a conventional parallel plate plastometer (two metal plates with a platen weight), measuring the time for compression of 12.8 cc of the material being tested from one-half inch to one-quarter inch thickness. One skilled in the art can readily add thinning agent to achieve a target range of plasticity. The final products should have a range of plasticity of 1 to 100 seconds, preferably 2–20 seconds.

Adding a lubricating oil reduces the stickiness but can lead to an oily feel. A variety of compounds can act as lubricating agents, particularly including high viscosity silicone oil (350 cs) or Q4 2903 from Dow Corning. Dimethylsiloxane oils with viscosities ranging from 50 to 60,000 centistokes, even one million cs or higher may also be useful. A mixture of lubricating agents may be used, as described in the examples below, or a single lubricating agent may be used. The amount can range from no lubricating oil to about 8% by weight. In one preferred embodiment, about 2% 350 cs silicone oil and 0.6–0.8% Q4 2903 are added. In general, the thinning agent, e.g. 10 cs silicone oil, can act to soften the putty. Other lubricating agents such as mineral oil and petroleum jelly may also be useful in practicing this invention.

Some materials can function as both a thinning oil and as a lubricating oil. Medium molecular weight and medium viscosity hydroxy-terminated polyalkylsiloxanes provide both properties. The net viscosity of a mixture of a low viscosity thinning oil with a higher viscosity lubricating oil will be some average of the viscosities of the component oils, but the properties imparted by the mixture to a putty mixture will depend on the characteristics of each oil component. The order of adding components when making a putty can be varied almost at will without significantly changing the ultimate properties of the putty, so adding two components as a single mixture is essentially equivalent to adding each component one at a time.

A putty mixture can be tested by simply feeling how the putty works in the users hand. Excess lubricating oil tends to leak out of the putty or exude. A lubricating oil may be of too high a viscosity. Silicone oils of several thousand centistokes tend to exude to some degree and leave an "after touch" or greasy feeling and an unpleasant residue on the hands of a user.

The mixture now has proper density, stiffness and stickiness but this putty will become sticky again if it absorbs moisture. One of the principle applications of the new putty is as an exercise aid, which requires that a patient manipulate the putty by hand. Moisture such as perspiration on the patient's hands will be absorbed by the putty, which makes the putty sticky. This makes the putty more difficult to handle and also gives it a less desirable feel. After a few minutes of working the putty by hand, it will usually become very sticky.

Adding a moisture scavenger to the putty restores the desirable properties. Molecular sieves, preferably 3 Å or 4 Å, or silica gel each can be used effectively, even in combination. The molecular sieves are very effective moisture scavengers at low water vapor pressures. Silica gel has a higher capacity for moisture but is a less effective absorbent at low vapor pressures. Moisture scavengers have a finite capacity for moisture, so enough should be added to endure anticipated handling conditions. Eventually, through continued use, the moisture scavenger will be spent and the inherent stickiness problem will return.

One way to test for moisture-absorbing capacity of putty is to work 0.5 g water into 20 g putty. If the putty does not become unduly sticky, it has sufficient drying capacity. This test can be performed and judged easily by one skilled in the art.

The amount of moisture scavenger can vary over a wide range, between about 0.1% and 20% by weight. In a preferred embodiment, the total content of molecular sieves plus silica gel is in the range of about to 5–15% by weight. In one preferred embodiment, the moisture scavenger is molecular sieves, 4.8–5.3% by weight. In another preferred embodiment, silica gel, 5% by weight, is added to the putty.

Molecular sieves and silica gel are available from W. R. Grace.

Other additives improve the "hand" or general feel and handling characteristics of the putty. Glycerine is a polarity modifier which interacts with the borosilicone to maximize the polymeric nature of the borosilicone and maximize bounce. Mother useful polarity modifier is polyethylene glycol. Glycerine also acts as a softener, but adding too much glycerine gives a product with an undesirable feel, almost dirty. The proportion of polarity modifier may range from none to about 2.5% by weight. In a preferred embodiment, 0.4–1% glycerine is added to the final putty. Other softeners may be useful, including oleic acid, aluminum stearate and glyceryl oleate.

Finally, one or more colorants can be added, preferably no more than about 3% by weight. Preferred colorants are inert, with a density of about 1.0 g/cc. Colorants useful in practicing this invention include both dyes and pigments. However, many dyes and even some pigments tend to bleed out of the putty and stay on the hand of the user. Preferred colorants include the "Fluorescent" pigment line from Day-Glo, Cleveland, Ohio. In a preferred embodiment, less than 10% by weight, preferably less than about 3%, of colorant is added to the final putty.

BALANCING COMPONENTS

The target product of this invention is a light weight ($\rho$=0.5–0.7 g/cc) product that is putty-like at low viscosities (low resistance to flow) with a reasonable working life and a dry feel (hand). The addition of each component may affect the balance of properties in the final putty. The effect of the principal components on stickiness, flow resistance, working life and density is illustrated in FIG. 1. Other factors to consider include moisture absorbing capacity, plasticity, and handling characteristics of the final product.

Silica—Removal of silica (a reinforcing filler) reduces density but also reduces moisture capacity. Adding freely ground silica improves moisture capacity but increases density.

Microspheres—Adding microspheres reduces density and increases resistance to flow but also reduces working life of the final putty. Adding microspheres generally necessitates adding additional thinning oil to maintain desirable properties. If too many microspheres must be added to maintain the density, then the volume percent of the borosilicone base will decrease. If that volume percent drops below a critical level, the plasticity and handling characteristics of the putty will degrade.

Moisture scavengers—Adding moisture scavenger will increase the moisture capacity of the putty. However, since both sieves and silica gel are relatively dense (about 2 g/cc), addition of a large amount of moisture scavenger may necessitate adding additional density-reducing filler to maintain the desired final product density.

One skilled in the art might choose to prepare a multiple pole chart with each pole representing a property of the final putty, such as moisture-carrying capacity, density, plasticity, stickiness, stiffness and other parameters. However, the preferred ranges of each additive have been found to work successfully with a wide range of proportions of other components. One skilled in the art may prefer to evaluate volume percent of component rather than weight percent.

Light-weight putties were prepared by the following processes:

EXAMPLE 1 a. Work borosilicone rubber base, colorants, oils and ExpanCel 551 DU on a two-roll mill or dough mixer.
b. Heat in 225 Degree F. oven for 30 minutes.
c. Allow to cool
d. Re-work expanded putty.
e. Add moisture scavenger.
f. Adjust resistance with glycerine and 10 cs silicone oil when needed.

EXAMPLE 2 a. Preheat silicone oil to 240 degrees F.
b. Slowly add 551 DU to hot oil.
c. Skim expanded 551 off oil.
d. Repeat b & c until all 551 DU is expanded.
e. Work the expanded 551/oil mixture into the borosilicone, colorant and oil mixture on a two-roll mill or dough mixer.
f. Add moisture scavenger.
g. Adjust resistance with glycerine and 10 cs silicone oil when needed.

EXAMPLE 3 a. Mix 84 parts (by weight) 10 cs silicone with 16 parts (by weight) ExpanCel 551 DE.
b. Work the 84/16 mixture into borosilicone rubber, colorants and remaining silicone oils with a two-roll mill or dough mixer.
c. Add moisture scavenger.
d. Adjust resistance with glycerine and 10 cs silicone oil when needed.

EXAMPLE 4 a. Mix silicone oils with glass microspheres.
b. Work oil/microsphere mixture into borosilicone rubber base, colorants, and any other components on a two-roll mill or dough mixer.
c. Adjust resistance with glycerine and 10 cs silicone oil when needed.

EXAMPLE 5

Medium-Resistence Putty

The following formula, compounded using the methods of either Example 1 or Example 2, above, provided a medium putty. The colorant resulted in a hot pink product. The recipe was formulated to produce a putty with a density of 0.6 g/cc. Although variations in processing can affect the final density, the recipe reliably produced a putty with a density between 0.5 and 0.7 g/cc.

| Ingredients | Parts per 100 Rubber | Weight Percent |
| --- | --- | --- |
| Borosilicone | 100.00 | 49.9% |
| Syloid Zn-1 (Mol. sieves) | 10.53 | 5.3% |
| 10 cs Silicone oil | 62.56 | 31.2% |
| 350 cs Silicone oil | 4.91 | 2.5% |
| ExpanCel 551 DU | 13.45 | 6.7% |
| Aurora Pink A-11 | 6.60 | 3.3% |

-continued

| Ingredients | Parts per 100 Rubber | Weight Percent |
|---|---|---|
| Q4 2903 | 1.14 | 0.6% |
| Glycerine | 1.29 | 0.6% |
| TOTAL | 200.47 | 100.0% |

EXAMPLE 6

Low-Resistance Putty

The following formula, compounded using the methods of either Example 1 or Example 2, above, provided a soft putty. The colorant resulted in a lavender product. The recipe was formulated to produce a putty with a density of 0.6 g/cc. Although variations in processing can affect the final density, the recipe reliably produced a putty with a density between 0.5 and 0.7 g/cc.

| Ingredients | Parts per 100 Rubber | Weight Percent |
|---|---|---|
| Borosilicone | 100.00 | 45.5% |
| Syloid Zn-1 | 10.54 | 4.8% |
| 10 cs Silicone oil | 77.81 | 35.4% |
| 350 cs Silicone oil | 4.92 | 2.52% |
| ExpanCel 551 DU | 14.45 | 6.6% |
| Aurora Pink A-11 | 3.30 | 1.5% |
| Horizon Blue A-19 | 3.30 | 1.5% |
| Glycerine | 3.77 | 1.7% |
| Q4 2903 | 1.86 | 0.8% |
| TOTAL | 219.95 | 100.0% |

EXAMPLE 7

Medium-Resistance Hot Pink Putty

The following formula, compounded using the method described in Example 3, provided a medium putty (8–12 second plastometer reading). The colorant resulted in a hot pink product. The recipe was formulated to produce a putty with a density of 0.6 g/cc. Although variations in processing can affect the final density, the recipe reliably produced a putty with a density between 0.5 and 0.7 g/cc.

| Ingredients | Parts per 100 Rubber | Weight Percent |
|---|---|---|
| Borosilicone | 100.0 | 54.9% |
| 5 micron Silica | 8.8 | 4.8% |
| Syloid Zn-1 | 9.6 | 5.3% |
| Syloid Al-1 | 10.4 | 5.7% |
| 10 cs Silicone oil | 12.3 | 6.8% |
| 350 cs Silicone oil | 3.5 | 1.9% |
| Aurora Pink A-11 | 3.8 | 2.1% |
| 14/86 Mixture ExpanCel 551DE/ 10 cs Silicone Oil | 32.3 | 17.7% |
| Glycerine | 1.6 | 0.9% |
| TOTAL | 182.1 | 100.1% |

EXAMPLE 8

Lime Green Putty

The following formula, compounded using the method described in Example 4, provided a useful putty. The colorant resulted in a lime green product. The formula resulted in a putty with a density of about 0.875 g/cc.

| Ingredients | Parts per 100 Rubber | Weight Percent |
|---|---|---|
| Q2 3233 (Dow Corning) | 100.0 | 50.0% |
| PM 6495 Glass Microspheres (PQ Corp.) | 30.0 | 15.0% |
| 10 cs Silicone Oil | 45.0 | 22.5% |
| 350 cs Silicone oil | 15.0 | 7.5% |
| E400 Polyethylene glycol (Dow) | 5.0 | 2.5% |
| DayGlo Green | 4.0 | 2.0% |
| Yellow 205 (United Mineral Corp.) | 1.0 | 0.5% |
| TOTAL | 200.0 | 100.0% |

EXAMPLE 9

Putty Base

The following formula, compounded using the method described in Example 4, provided a useful putty with a density of about 0.9 g/cc.

| Ingredients | Parts per 100 Rubber | Weight Percent |
|---|---|---|
| Q2 3233 (Dow Corning) | 100.0 | 62.9% |
| PM 6717 Glass Microspheres (PQ Corp.) | 19.0 | 12.0% |
| 10 cs Silicone Oil | 10.0 | 6.3% |
| 50 cs Silicone Oil | 15.0 | 9.4% |
| 350 cs Silicone oil | 15.0 | 9.4% |
| TOTAL | 200.0 | 100.0% |

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A bouncing putty comprising a borosilicone rubber base and a density-reducing filler wherein said density-reducing filler comprises rubber-base-compatible particles, said particles having an average particle size less than about 200 μm, and each of said particles having a contained volume which comprises a substantial percentage of gas and has a final density of approximately 0.33 to 0.95 g/cc.

2. The bouncing putty of claim 1 wherein said filler comprises microspheres.

3. The bouncing putty of claim 2 wherein said microspheres are formed from a material selected from the group consisting of plastic, glass, ceramic, silica and phenolic materials.

4. The bouncing putty of claim 2 wherein said microspheres are formed from a plastic selected from the group consisting of a copolymer of vinylidene chloride and acrylonitrile, and other thermoplastics.

5. The bouncing putty of claim 2 further comprising an additive selected from the group consisting of viscosity reducing agents, lubricating agents, moisture scavengers, polarity modifiers and colorants.

6. The bouncing putty of claim 1 wherein said bouncing putty has a final density of approximately 0.5 to 0.75 g/cc.

7. The bouncing putty of claim 1 wherein said bouncing putty has a final density of about 0.6 g/cc.

8. The bouncing putty of claim 1 wherein said density-reducing filler comprises less than about 80% by volume of the final bouncing putty.

9. The bouncing putty of claim 1 wherein said density-reducing filler comprises less than about 60% by volume of the final bouncing putty.

10. The bouncing putty of claim 1 further comprising a viscosity reducing agent compatible with borosilicone rubber.

11. The bouncing putty of claim 10 wherein said viscosity reducing agent is selected from the group consisting of a polydimethylsiloxane, a low molecular weight silanol, a hydroxy-terminated polydialkylsiloxane, a dimethyl cyclosiloxane and a polyalkylsiloxane containing one or more ethyl, isopropyl or phenyl groups.

12. The bouncing putty of claim 10 wherein said viscosity reducing agent has a viscosity less than about 50 centistokes.

13. The bouncing putty of claim 10 wherein said viscosity reducing agent comprises between 20 and 40%, by weight, of said bouncing putty.

14. The bouncing putty of claim 1 further comprising a lubricating agent.

15. The bouncing putty of claim 14 wherein said lubricating agent has a viscosity in excess of 50 centistokes.

16. The bouncing putty of claim 14 wherein said lubricating agent comprises less than about 8%, by weight, of said bouncing putty.

17. The bouncing putty of claim 1 further comprising a moisture scavenger.

18. The bouncing putty of claim 17 wherein said moisture scavenger is selected from the group consisting of molecular sieves and silica gel.

19. The bouncing putty of claim 17 wherein said moisture scavenger comprises less than about 20%, by weight, of said bouncing putty.

20. The bouncing putty of claim 1 further comprising a polarity modifier.

21. The bouncing putty of claim 20 wherein said polarity modifier is selected from the group consisting of glycerine and polyethylene glycol.

22. The bouncing putty of claim 20 wherein said polarity modifier comprises less than about 2.5%, by weight, of said bouncing putty.

23. The bouncing putty of claim 1 further comprising a colorant comprising less than about 10%, by weight, of said bouncing putty.

* * * * *

UNITED STATES PATENT AND TRADEMARK OFFICE
CERTIFICATE OF CORRECTION

PATENT NO. : 5,607,993
DATED : March 4, 1997
INVENTOR(S) : Michael Christy

It is certified that error appears in the above-identified patent and that said Letters Patent is hereby corrected as shown below:

Claim 1 should read

-- 1. A bouncing putty comprising a borosilicone rubber base and a density-reducing filler wherein said density-reducing filler comprises rubber-base-compatible particles,
    said particles having an average particle size less than about 200 µm, and
    each of said particles having a contained volume which comprises a substantial percentage of gas
and has a final density of approximately 0.33 to 0.95 g/cc.--

Signed and Sealed this

Seventeenth Day of February, 1998

Attest:

BRUCE LEHMAN

Attesting Officer    Commissioner of Patents and Trademarks